United States Patent
Freier, Jr.

[11] 3,789,684
[45] Feb. 5, 1974

[54] AIR COOLED SHUTTLE CLUTCH TRANSMISSION

[75] Inventor: Edward Freier, Jr., Port Washington, Wis.

[73] Assignee: Simplicity Manufacturing Company, Inc., Port Washington, Wis.

[22] Filed: Nov. 7, 1972

[21] Appl. No.: 304,498

[52] U.S. Cl. .................................. 74/230.17 D
[51] Int. Cl. ............................................ F16h 55/22
[58] Field of Search. 74/230.17 B, 230.17 D, 230.6; 308/77; 415/180

[56] References Cited
UNITED STATES PATENTS
3,628,390  12/1971  Van Der Lely et al...... 74/230.17 D FOREIGN PATENTS OR APPLICATIONS
752,129  2/1967  Canada ............................. 74/230.6
829,536  1/1952  Germany Primary Examiner—Leonard H. Gerin
Attorney, Agent, or Firm—Charles L. Schwab

[57] ABSTRACT

A cooling arrangement for a V-belt clutching and reversing transmission including a central pulley section flanked by pulleys on either side and wherein said flanking pulleys are provided with fan elements for moving air axially towards said central pulley section and the latter is provided with ribs for moving such air radially outward toward the periphery of said central pulley section for cooling such central pulley section, such flanking pulleys and the V-belts connected therewith.

1 Claim, 9 Drawing Figures

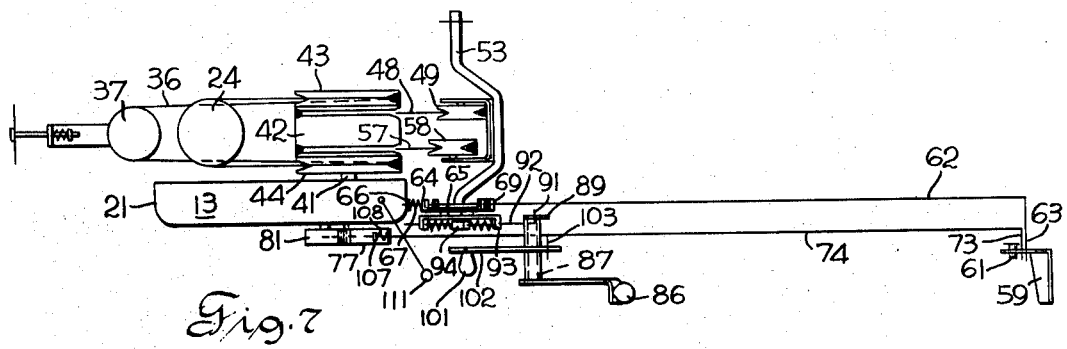
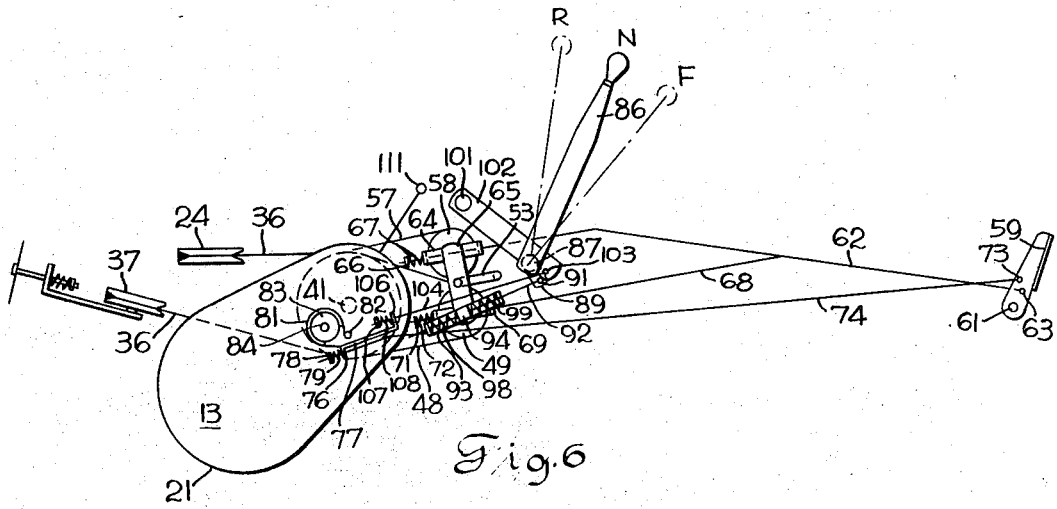

AIR COOLED SHUTTLE CLUTCH TRANSMISSION

This invention is concerned with a cooling system for a V-belt transmission for dissipating heat generated therein.

An object of this invention is to provide a simple V-belt transmission providing forward and reverse speeds and wherein the pulleys used in such transmission are provided with fan and rib elements for moving air in a desired direction to cool such pulleys and V-belts connected thereto.

A further object of this invention is to provide a simple V-belt transmission providing forward, reverse and neutral positions and wherein such transmission includes a central pulley section flanked by adjacent pulleys on either side and wherein such adjacent pulleys are provided with fan elements for moving air towards such central pulley section and the latter is provided with rib elements for moving such air radially outwards to cool the pulleys and V-belts forming such transmission.

These and other objects will become apparent to those skilled in the art from the following description taken in conjunction with the attached drawings, in which:

FIG. 6 is a diagrammatic side elevation view of the controls of the mower transmission;

FIG. 7 is a plan view of FIG. 6;

Figure 1:
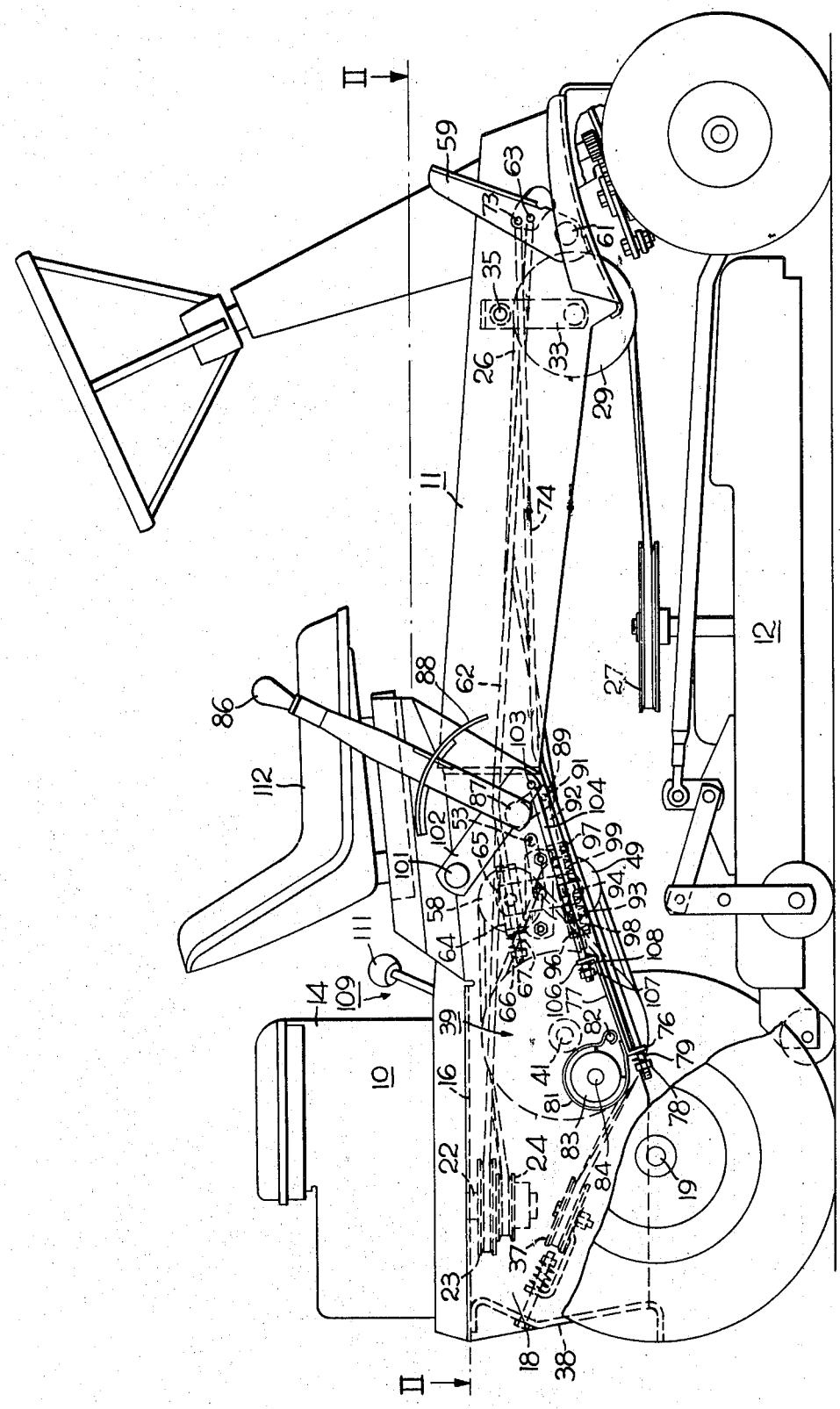
FIG. 1 is a side elevation view of a riding lawnmower incorporating features of the present invention.
Figure 2:
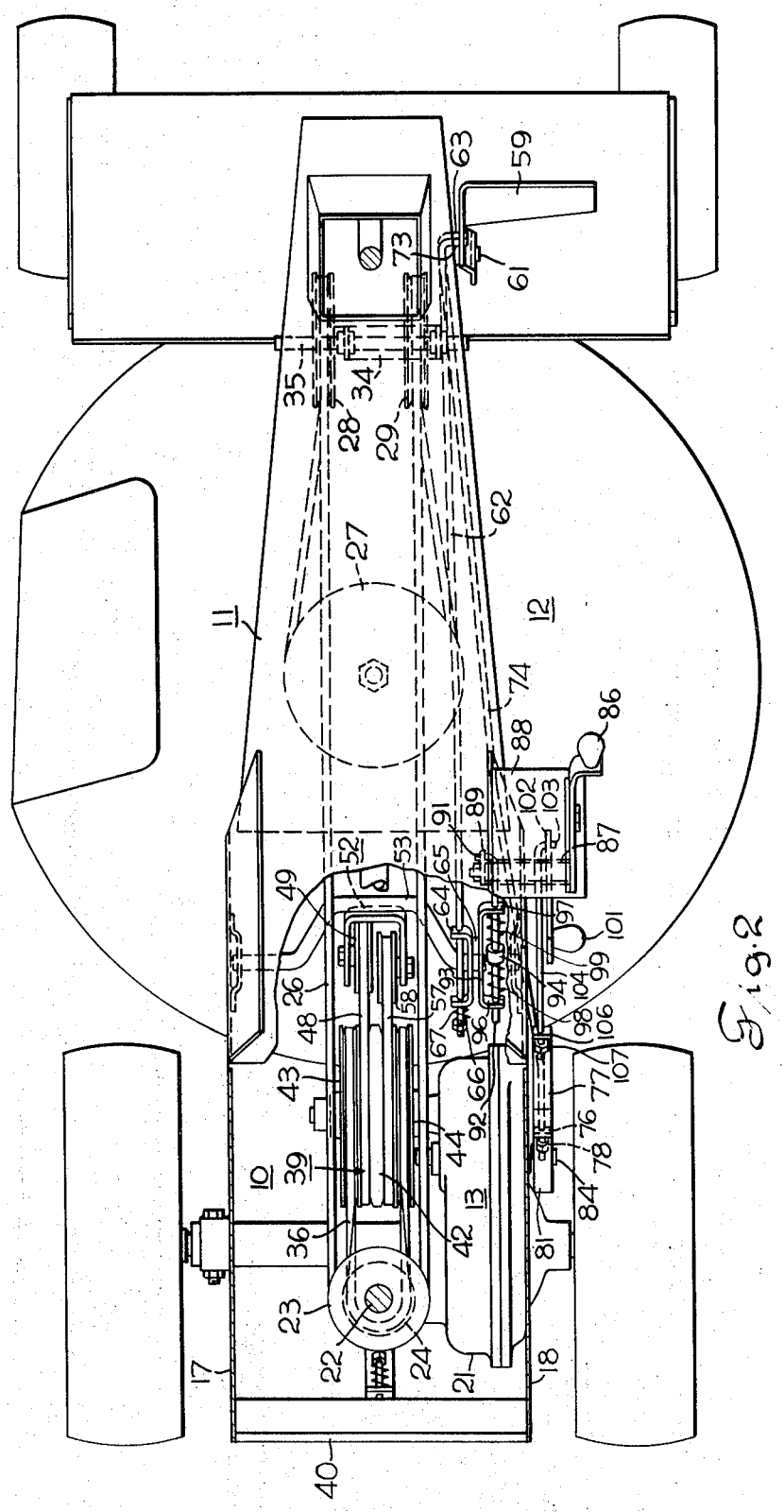
FIG. 2 is a view taken on line II—II of FIG. 1.

Referring to FIGS. 1 and 2, a self-propelled lawnmower 10, incorporating features of the present invention is seen including a chassis 11, a rotary mower attachment 12, a power transmission 13, and an engine 14. Chassis 11 provides a horizontal platform 16 for supporting the engine 14 and the transmission 13. The chassis 11 includes a pair of sidewalls 17 and 18 which are supported transversely spaced apart by a rear axle structure 19 including suitable reduction gearing enclosed in housing 21.

Figure 3:
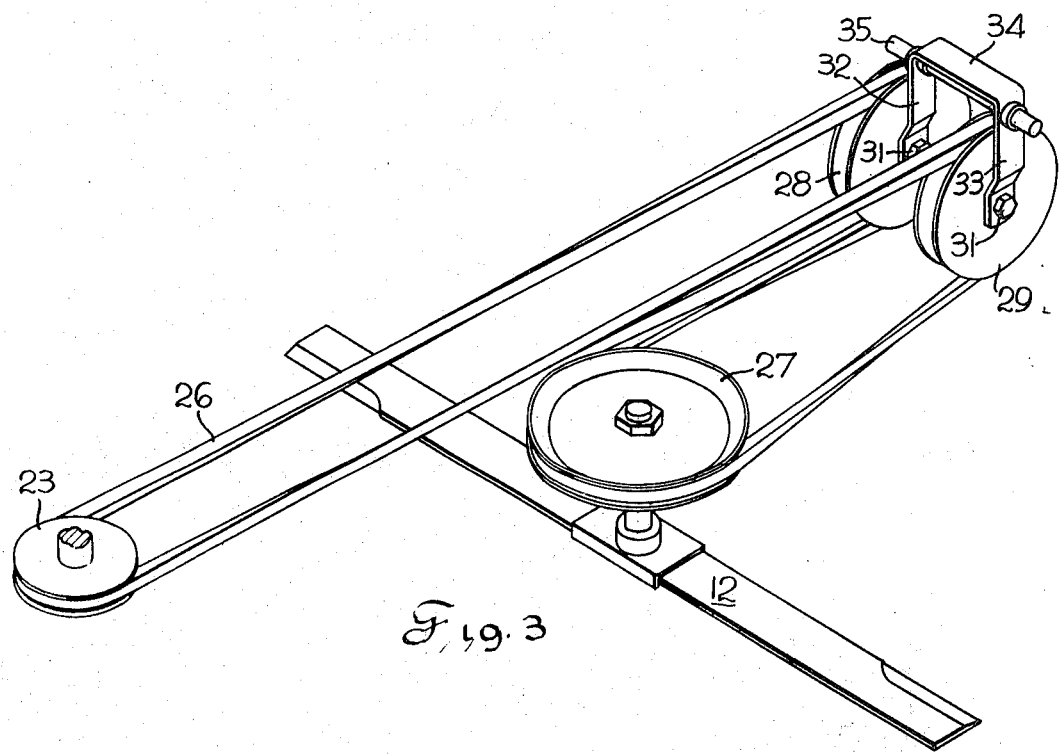
FIG. 3 is a perspective view of the mower blade drive with parts removed for clarity of illustration.

Engine 14 is provided with a depending drive shaft 22 to which are attached drive pulleys 23 and 24. Drive pulley 23 is connected by means of V-belt 26 with driven pulley 27 for driving mower attachment 12. A pair of pulleys 28 and 29 (FIG. 3) are mounted for rotation about bolts 31 which are carried by depending arms 32 and 33 of inverted U-member 34 which is pivotally attached to pin 35 pivotally connected to chassis 11 for movement about a transverse axis. V-belt 26 passes about pulleys 28 and 29 which tension such belt to provide a driving connection between engine 14 and driven pulley 27 of rotary mower attachment 12. Conventional operator controlled toggle means (not shown) are provided for retaining pulleys 28 and 29 in belt tightening relation to V-belt 26 or in belt relaxing relation.

Figure 4:
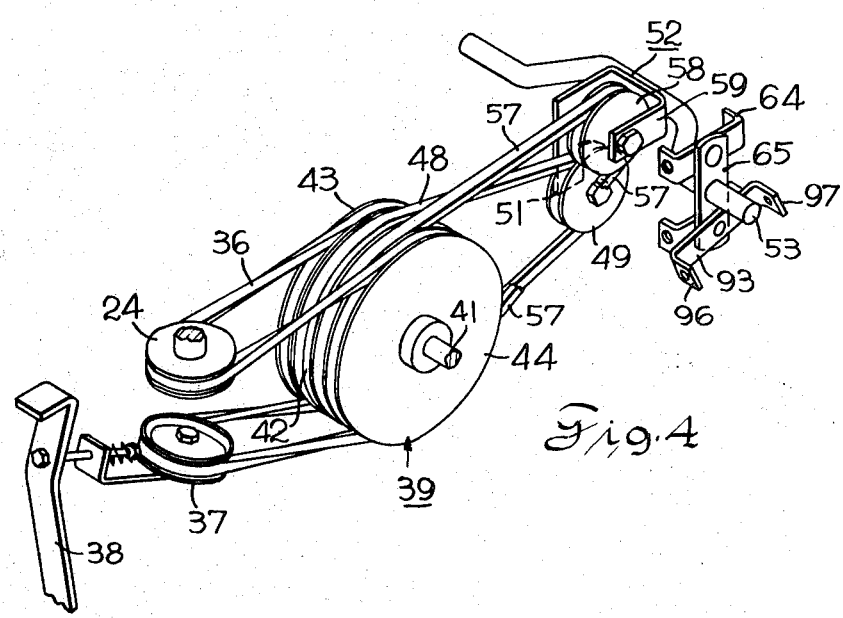
FIG. 4 is a perspective view of the mower belt transmission drive with parts removed for clarity of illustration.
Figure 5:
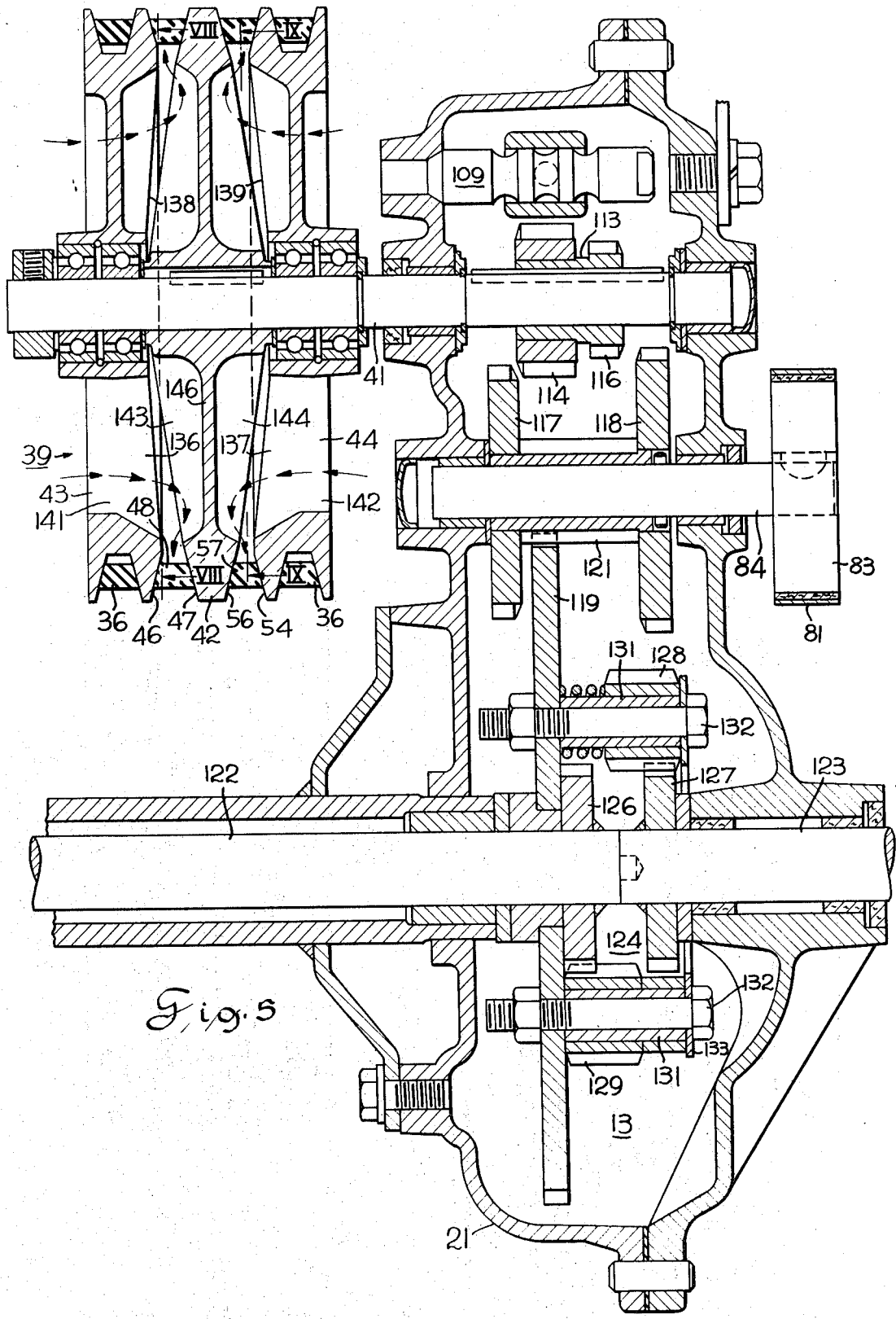
FIG. 5 is an enlarged top elevation view in section through the transmission.

Drive pulley 24 (FIG. 4) is connected by V-belt 36 to idler pulley 37 which is adjustably spring-mounted from structural member 38 (FIG. 1) attached between sidewalls 17 and 18 by cross member 40. Between drive pulley 24 and idler pulley 37 belt 36 passes halfway around a clutch and transmission mechanism 39 which is mounted about an input shaft 41 rotatably supported in housing 21 (FIG. 5). A central half-pulley member 42 (see FIGS. 4 and 5) is keyed to shaft 41. Pulleys 43 and 44 are mounted on shaft 41 for rotation relative thereto and are positioned adjacent to half-pulley section 42. Pulley 43 is provided with a surface 46 adjacent to the periphery thereof which with surface 47 on half-pulley section 42 forms a seat for a V-belt 48 which is mounted about idler pulley 49 (FIG. 4) rotatably carried by one leg 51 of a U-bracket 52 attached to a crank 53 pivotally supported in sidewalls 17 and 18 (FIG. 2). Pulley 44 (FIG. 5) is provided with a surface 54 adjacent to the periphery thereof which with surface 56 of half-pulley section 42 forms a seat for a V-belt 57 which is mounted about idler pulley 58 (FIG. 4) rotatably carried by the other leg 59 of U-bracket 52. It is to be noted that pulleys 49 and 58 are mounted at different heights on U-bracket 52 so that as crank 53 is turned pulleys 49 and 58 will be moved toward or away from shaft 41 alternately. In other words, when crank 53 is positioned with pulleys 49 and 58 equidistant from shaft 41, this is a neutral position and neither belt 48 nor 57 will cause a driving connection between pulleys 49 or 58 with half-pulley section 42. As crank 53 is pivoted clockwise as viewed in FIG. 4 a belt tightening relation is established between pulley 58 and half-pulley section 42 through V-belt 57 so that belt 36 drives half-pulley section 42 and thereby shaft 41 and the connected transmission 13 in a forwardly direction. If crank 53 is pivoted counterclockwise as viewed in FIG. 4 a belt tightening relationship is established between pulley 43 and half-pulley section 42 resulting in half-pulley 42 being driven by belt 36 in a direction opposite to which it previously was driven and this results in shaft 41 and transmission 13 being driven a reverse direction.

A foot pedal 59 is pivotally mounted on pin 61 carried by chassis 11 (see FIGS. 1, 2, 6 and 7). A rod 62 has one turned-over end 63 pivotally received in pedal 59. The other end of rod 62 passes through a U-shaped member 64 and has that end thereof threaded to receive nut 66. A compression spring 67 is interposed between nut 66 and U-shaped member 64 in biasing relation to said latter member. Member 64 is pivotally attached to the upper end of strap 65 which is attached at a midportion thereof to crank 53 for movement therewith. A rod 68 (FIG. 6) has a forward end thereof attached at as by welding to a midportion of rod 62 and the rearward end of rod 68 passes through openings in a rod guide 69 pivotally attached to lower end of strap 65. The rearward end of rod 68 is threaded to receive a nut 71. A compression spring 72 is interposed between nut 71 and rod guide 69 about rod 68 in biasing relation to guide 69.

In other words, when the operator steps down on the foot pedal 59 this exerts a pull on rod 62 compressing either spring 67 or 72 or both and thus moving strap 65, crank 53 and shifting pulleys 49 and 58 to the neutral position shown in FIG. 1 wherein neither pulley 49 nor 58 is tightening belt 48 or 57 to establish a driving relation with half-pulley 42 for providing a drive from belt 36 to shaft 41 and its connected transmission 13.

Also pivotally received in foot pedal 59 (FIGS. 6 and 7) is turned-over portion 73 of rod 74. The other end of rod 74 passes through a turned-over end portion 72 of Z-bar 77 and is threaded to receive a nut 78. A spring 79 is interposed about rod 74 between portion 76 and nut 78. Z-bar 77 is attached to one end of brake band 81 which has its other end connected to pin 82 carried by transmission housing 21. Brake band 81 surrounds a brake disc 83 keyed to brake shaft 84 forming a part of power transmission 13 as will be later described.

A forward, reverse and neutral shift is provided by movement of hand lever 86 which is pivoted for movement about shaft 87 pivotally carried by chassis 11. Hand lever 86 is provided with a coacting quadrant member 88 (FIG. 1) also attached to chassis 11 which quadrant member provides conventional means (not shown) for retaining lever 86 in any desired adjusted position. As shown, lever 86 is in a neutral position, if moved forwardly lever 86 would be in a forward drive position and if moved rearwardly lever 86 would be in a reverse drive position.

Lever 86 is provided with a depending portion 89 which pivotally receives a turned-over end portion 91 of rod 92. The other end of rod 92 is slideably received in rod guide 93 which pivotally attaches to a lower portion of strap 65. Rod 92 is provided with a set collar 94 attached thereto between the legs 96 and 97 (FIG. 1) of rod guide 93. Springs 98 and 99 are mounted about rod 92 and positioned between leg 96 and collar 94 and between leg 97 and collar 94, respectively, so that if the operator wishes to run the mower forwardly, he moves lever 86 forwardly. This results in depending portion 89 moving rearwardly. This rearward movement of portion 89 moves rod 92 rearwardly compressing spring 98 against leg 96 until crank 53 is moved clockwise as viewed in FIG. 4 causing a tightening of belt 57 and thereby establishing a driving relation between pulley 44 and half-pulley 42 driving shaft 41 in a forward direction. If the operator wishes to run the mower rearwardly, he moves lever 86 rearwardly, this results in depending portion 89 moving forwardly. This forward movement of portion 89 moves rod 92 and compresses spring 99 against leg 97 until crank 53 is moved counterclockwise as viewed in FIG. 4 causing a tightening of belt 48 and thereby establishing a driving relation between pulley 43 and half-pulley 42 in a rearward direction driving shaft 41 in a rearward direction and such rotation of shaft 41 causes mower 10 to move in a reverse direction.

If lever 86 is moved to the central or neutral position this moves rod 92 to the position shown in FIG. 1 wherein both springs 98 and 99 are biasing collar 94 and crank 53 to the neutral position shown wherein neither belt 48 nor belt 57 is tightened so that no driving connection between either pulley 43 or 44 is secured with half-pulley 42.

Also mounted for movement about shaft 87 is the parking brake lever 101 which is provided with a strap 102 attached thereto and which strap pivotally receives one end of a turned-over portion 103 of rod 104. The other end of rod 104 passes through an opening in turned-over portion 106 of Z-bar 77. This other end of rod 104 is threaded to receive a nut 107. A spring 108 is positioned about rod 104 between nut 107 and turned-over portion 106. Brake lever 101 is toggle mounted relative to shaft 87 so that when brake lever 101 is depressed sufficiently to move turned-over portion 106 over center, this results in a pull-on Z-bar 77 and the aforesaid toggle arrangement maintains Z-bar 77 applying a tightening of brake band 81 about brake disc 83.

Shift mechanism (FIGS. 1 and 5), generally designated 109, is operated by a manually actuatable gear shift lever 111 readily accessible to an operator occupying seat 112, provides for sliding a compound gear 113 on splines of the input shaft 41 back and forth to selectably mesh its high and low sections 114, 116 respectively with the second and first speed gears 117, 118 on the brake shaft 84. Thus low speed propulsion of the mower 10 results when the compound forward gear is shifted to the right of neutral to bring the low speed gear 116 into mesh with the first speed gear 118. Similarly, high speed propulsion is effected by shifting the compound gear to the left of neutral to bring the high speed gear 114 thereof into mesh with second speed gear 117 on the brake shaft 84.

The differential transmission is of the spur gear type and includes a main gear 119 meshing with a gear 121 connecting gears 117 and 118. Main gear 119 is rotatable about the common axis of the axle shafts 122, 123, both with and with respect thereto. Gear means designated generally by the reference numeral 124 includes planetary gearing including a pair of spur gears 126 and 127 respectively fixed to the shafts 122 and 123, and two pairs of planet gears 128 and 129. One of the planet gears of each pair meshes with one of the spur gears and the other of each pair of planet gears meshes with the other spur gear. In addition, the planet gears mesh with one another, for which purpose the planet gears are wider than the spur gears.

All of the planet gears are carried by the main gear 119 being journaled on sleeves 131 that are slipped onto tie bolts 132 by which the main gear 119 and a disc 133 are connected in spaced coaxial relationship therewith, the sleeves 131 serving to space the disc from the main gear. The main gear together with the discs 133 and the tie bolts connecting them thus constitute a power input means through which the transmission is connected to a power source. The structure described constitutes a conventional differential transmission.

As to the operation of the mower with control lever and shift lever 111 with both in neutral position, the engine 14 is started. Parking brake 101 is released and shift lever 111 is moved into either low or high gear while control lever 86 is moved into forward position which moves pulley 58 on crank 53 into belt-tightening relationship with V-belt 57. One side of V-belt 57 contacts surface 54 of transmission pulley 44 and the opposite side of V-belt 57 contacts surface 56 of disc-clutch 42 causing disc-clutch 42 to be driven by belt 36 through this frictional contact. Disc-clutch 42 is keyed to shaft 41 and moves the mower in a forward direction of travel. To reverse the direction of mower travel, control 86 is pulled to reverse position which moves pulley 58 on crank 53 out of belt-tightening relation with V-belt 57 and thereby interrupting the drive existing between pulley 44 and disc-clutch 42 and moves pulley 49 into belt-tightening relation to V-belt 48 which on one side moves into frictional engagement with side 47 of disc-clutch 42 and with side 46 of pulley 43 which is rotating in a clockwise direction from being driven by another portion of belt 36 and thus the mower 10 moves in a reverse direction.

With control lever 86 engaged to provide travel in either direction, and foot pedal 59 depressed crank 53 returns pulleys 49 and 58 to neutral position. With the release of foot pedal 59, pulleys 49 and 58 return to the position they were previously placed in by control lever 86 and thus it is seen that foot pedal 59 can be used as a conventional clutch for controlling the ground traversing movement of the mower.

No matter what position lever 86 is positioned in, whether in forward, reverse or neutral when foot pedal 59 is stepped down on, simultaneously brake rod 74 applies a pull on Z-bar 77 tightening brake band 81 about brake disc 83 and thereby braking shaft 84 in the connected transmission 13; while also shifting pulleys 49 and 58 to the neutral position shown in FIG. 1. Whatever position 86 is positioned in, forward, reverse or neutral then when foot pedal 59 is released, pulleys 49 and 58 return to the positions they were in prior to foot pedal 59 being stepped down on.

It is to be noted that this forward and reverse speed belt transmission combined with the shown two-speed gear shift transmission provides a combination transmission having two forward and two reverse speeds.

Figure 8:
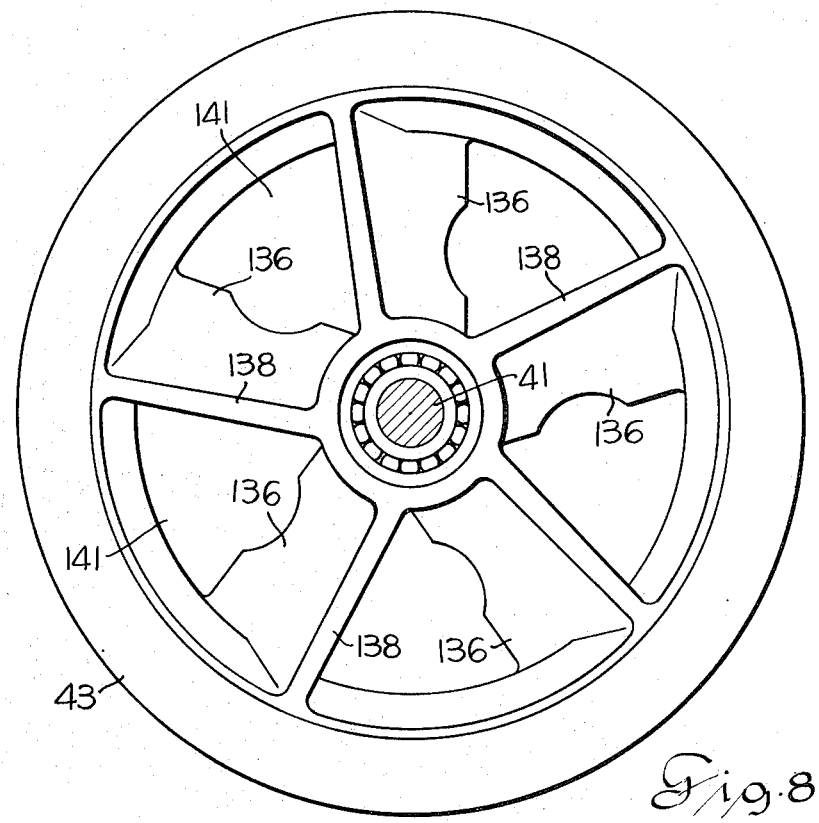
FIG. 8 is a section view taken on line VIII—VIII of FIG. 5.
Figure 9:
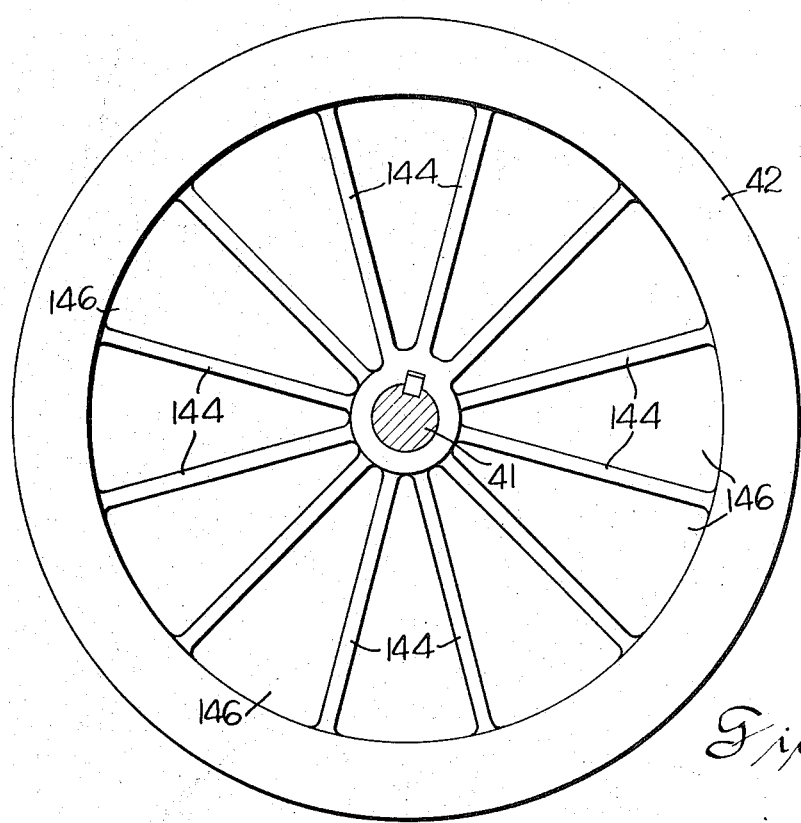
FIG. 9 is a section view taken on line IX—IX of FIG. 5.

Referring to FIGS. 5, 8 and 9, it is seen that pulleys 43 and 44 are provided with fan blade elements 136 and 137, respectively, incorporated in the webs 138 and 139 thereof and which blade elements are designed to move air axially as pulleys 43 and 44 rotate. Fan blade element 136 moves air axially through opening 141 in web 138 towards the right as viewed in FIG. 5 and fan blade element 137 moves air axially through opening 142 in web 139 towards the left. Half-pulley or disc-clutch 42 is provided with rib elements 143 and 144 incorporated in the web 146 thereof which rib or blade elements are designed to move air radially outwardly so that the paths taken by air moved by blade elements 136, 137, 143 and 144 are shown by arrows in FIG. 5 and this movement of air produces a cooling effect on the pulleys 42, 43 and 44 and on the V-belts connected thereto. The air moved by fan blade elements 136 and 137 moves axially in opposite directions towards half-pulley 42 and these two air streams infringe on half-pulley 42 whose fan elements 143 and 144 pick up these impinging air streams and moves same radially outwardly to provide a cooling circulation of air for the pulleys and belts forming the transmission.

The embodiments of the invention in which an exclusive property or privilege is claimed are defined as follows:

1. In a V-belt transmission and reversing mechanism having a pair of spaced apart pulleys mounted on a shaft, a central half-pulley section attached to said shaft between said pulleys and closely adjacent to each of said pulleys, each of said pair of pulleys being provided with a half-pulley section coacting with said central half-pulley section to provide a pulley for receiving a V-belt positionable for drivenly connecting said central half-pulley section to one of said pair of pulleys, the improvement comprising heat dissipating means for said mechanism and wherein each of said pair of pulleys is provided with a fan blade incorporated in the webs thereof for moving air axially toward said central half-pulley section, and said central half-pulley section is provided with a solid web for intercepting the axially moving air and said solid web is provided with radially extending blades for changing the direction of the axially moving air to a radial outward direction toward said belt and the outer surfaces of said pulleys and said central half-pulley section.

* * * * *